United States Patent [19]

Inagami et al.

[11] 4,269,863

[45] May 26, 1981

[54] STARCH AND AGAR CONTAINING NOODLES AND PROCESS OF PREPARING

[75] Inventors: Kaoru Inagami, Tokyo; Kazutaka Ohmura, Asaka; Masao Haruna, Tokyo; Takeshi Terabayashi, Hino all of Japan

[73] Assignee: Calpis Shokuhin Kogyo Kabushiki Kaisha, Tokyo, Japan

[21] Appl. No.: 85,421

[22] Filed: Oct. 16, 1979

[30] Foreign Application Priority Data

Jun. 12, 1979 [JP] Japan .................................. 54-73073

[51] Int. Cl.³ .......................... A23L 1/16; A21D 2/36; A23L 1/04; A23L 1/195
[52] U.S. Cl. .................................... 426/550; 426/557; 426/575; 426/578; 426/276; 426/804
[58] Field of Search .............. 426/573, 451, 575, 578, 426/557, 560, 661, 451, 496, 516, 517, 804, 276, 550

[56] References Cited

U.S. PATENT DOCUMENTS

| | | | |
|---|---|---|---|
| 3,836,680 | 9/1974 | Salza | 426/557 |
| 4,192,900 | 3/1980 | Cheng | 426/578 |

FOREIGN PATENT DOCUMENTS

| | | | |
|---|---|---|---|
| 46-27703 | 8/1971 | Japan | 426/276 |
| 49-18220 | 5/1974 | Japan | 426/575 |

Primary Examiner—Joseph M. Golian
Assistant Examiner—Elizabeth J. Curtin
Attorney, Agent, or Firm—Stevens, Davis, Miller & Mosher

[57] ABSTRACT

A method for the production of a low-caloric noodle containing agar and starch as the main ingredients and the low-caloric food produced by the method, which method comprises the steps of preparing a sol mixture consisting of 100 parts by weight of water, 0.7 to 3.5 parts by weight of agar and 10 to 40 parts by weight of starch and possessed of a viscosity of 100 to 6500 cp at 55° C. and subsequently shaping the sol mixture by extrusion through an orifice.

18 Claims, No Drawings

STARCH AND AGAR CONTAINING NOODLES AND PROCESS OF PREPARING

BACKGROUND OF THE INVENTION

1. Field of the Invention

This invention relates to a method for the production of low-caloric noodles containing agar and starch as the main ingredients and to the low-caloric noodles obtained by this method.

2. Description of the Prior Art

In recent years, improvement of dietary life has reached a point where an increasing proportion of people suffer from a problem of fatness due to super-nutrition in spite of improved nutritive conditions enjoyed by the majority of people. This problem has caused a serious public concern. It is said that fatness is detrimental to health and forms a major cause for diseases such as hyperpiesia and diabetes and leads to an early death. For the purpose of remedying and preventing this phenomenon of fatness, there have been developed a number of low-caloric noodles. What is called food, by nature, is expected to meet the primary requirement that it should satisfy appetite. For any food, it is quite difficult to satisfy this requirement and, at the same time, another requirement that it should possess a lowered caloric value.

One of the inventions proposed to date concerning the reduction of caloric values concerns agar noodles disclosed by Japanese Patent Publication No. 18220/1974. With agar used as one of the principal raw materials, this invention produces low-caloric agar noodles by a method which comprises mixing a hot agar solution with wheat flour, pouring the resultant mixture into a container, allowing it to cool off and set in the form of agar gel, cutting the gel into a multiplicity of strings, freezing to denature the strings and finally drying the denatured strings. The agar noodles thus produced assume a mouthfeel which is devoid of viscoelasticity and, therefore, is dissimilar to the mouthfeel peculiar to noodles made of wheat flour as a principal raw material. When a mass of gel is formed and then cut into strings of gel, these strings of gel exhibit very weak viscoelasticity and are fragile because the gel is nothing more than a fixed shape of agar retaining a great volume of water. For the purpose of remedying these drawbacks, the strings of gel are subjected to denaturation with freezing. As is frequently observed in dried bean-protein curd and dried bii-fun (rice starch noodles), however, the denatured strings of gel acquire increased hydrophobicity such that even after they are reconstituted with water, they assume a mouthfeel dissimilar to the popular mouthfeel of noodles made mostly of wheat flour. Moreover, this method cannot be called industrially efficient because it entails highly complicated steps such as in forming a mass of gel and cutting the mass into strings and freezing the strings of gel at low temperatures of $-10°$ to $-20°$ C. for more than 24 hours.

SUMMARY OF THE INVENTION

This invention has been accomplished by the inventors' diligent study and an object of this invention is to provide low-caloric noodles which satisfies appetite. The reduction in caloric value is accomplished by making the most use of agar's high capacity for gelation and thereby decreasing the amount of high-caloric ingredients. Recently, reports on observations that indigestible polysaccharides such as agar, pectin and glucomannan are effective in lowering the cholesterol content of the blood and removing toxic substances and carcinogenic substances from the intestines by dietary fiber effect have been published and attracted public attention.

Another object of this invention, therefore, is to provide low-caloric noodles which use agar as one of the principal ingredients and, therefore, brings about the aforementioned effects.

DETAILED DESCRIPTION OF THE INVENTION

The inventors took particular notice of the fact that various kinds of noodles constitute staple food items throughout the world, and carried out a study for the purpose of lowering caloric values of noodles which are in great demand. This invention has been completed in consequence of this study.

The inventors continued the study in search of a method which, by a simple procedure and with a low-caloric material such as agar, produces low-caloric noodles capable of giving a mouthfeel not so shivering (jelly-like) as is experienced with itokonnyaku (glucomannan noodles) but as viscoelastic as is obtained with noodles made of wheat flour as a principal raw material. The inventors, using as a starting point the established method for producing noodles by the addition of 150 to 300 parts by weight of wheat flour to 100 parts by weight of water, tried substitution of a low-caloric material for part of the wheat flour used in such noodles.

As low-caloric materials possibly available for the purpose of this substitution, the aforementioned agar, pectin and glucomannan which are indigestible polysaccharides possessed of dietary fiber effect were studied with respect to their adaptability for the production of noodles. Pectin was suitable for the production of jelly-like foods possessed of a three-dimensional structure but not suitable for the production of string-like foods possessed of a two-dimensional structure. Glucomannan fails to produce string-like foods unless it is subjected to an alkali treatment. As is widely known, however, the product prepared by the alkali treatment of glucomannan possesses no dietary fiber effect and acquires a peculiar irremovable odor. Thus, glucomannan can hardly suit the purpose of the present invention.

The inventors pursued the study of noodles prepared by utilization of agar. As noodles of the type made by using agar, tokoroten (jelly made of agar alone) and the aforementioned noodles disclosed by Japanese Patent Publication No. 18220/1974 are known to the art. These noodles exhibit poor viscoelasticity and tend to break easily, and their tastes are such that they are barely used as fancy food. They are taken in specific districts (the Orient, for example) during specific seasons (summer). The inventors, therefore, sought noodles of a type which satisfies a wide dietary preference and, accordingly, is suitable for ready adoption in everyday meals with high frequency.

It has now been ascertained that noodles of the type sought for are obtained by a rigidly defined combination and a specific method in which agar and starch are utilized. This method may be outlined as follows. In the present invention, although the proportion of the amount of agar to that of water is not appreciably different from the proportion involved in the production of agar noodles disclosed by Japanese Patent Publication No. 18220/1974, the proportion of the amount of starch to that of agar is definitely different from the proportion involved in the aforementioned noodles. To be specific, in Japanese Patent Publication No. 18220/1974, the amount of wheat flour is equal to or slightly greater than that of agar, namely about 1 to 5 parts by weight per 100 parts by weight of water. In the present invention, the amount of starch is from 10 to 40 parts by weight. Thus it is clear that the optimum range of the proportion of starch for this invention is remarkably different from that of the prior art.

In the case of harusame (sticks of bean jelly) which is well known, the amount of starch used is about 100 parts by weight based on 100 parts by weight of water. If, for the purpose of lowering the caloric value of the known starch noodles made of starch alone, the amount of starch used is decreased to the order of 10 to 40 parts by weight as involved in the present invention, the noodles finally produced exhibit poor viscoelasticity.

When noodles are produced by adding 5 parts by weight of starch (in the place of grain flour) with 100 parts by weight of an aqueous solution containing 1.5% of agar as disclosed by Japanese Patent Publication No. 18220/1974, they exhibit as poor viscoelasticity as tokoroten (jelly made of agar alone).

As a result of the study described above, it has been ascertained that to produce noodles which have a texture of proper strength and pleasing palatability, the sol mixture should consist of 100 parts by weight of water, 0.7 to 3.5 parts by weight of dry agar and 10 to 40 parts by weight of starch and should possess a proper viscosity and should be shaped into noodles by means of extrusion.

The noodles of the present invention which are obtained by preparing a sol mixture satisfying the aforementioned condition and shaping this sol mixture by extrusion through an orifice have been found to exhibit far better dietary properties as noodles than tokoroten (jelly made of agar alone) and agar noodles obtained, as disclosed by Japanese Patent Publication No. 18220/1974, by the steps of pouring a sol in a mold, cooling it off to gel and cutting the solidified gel with fine taut lines. The superiority of the noodles of this invention to the conventional low-caloric noodles may be ascribable to the fact that the sol mixture possessed of a fixed condition of viscosity is shaped into noodles by extrusion, which is believed to impart a fixed directionality to the arrangements of agar and starch or bring them into an advantageous state of distribution in the sol mixture.

As described above, the present invention has accomplished a method for the production of low-caloric noodles, characterized by the steps of preparing the sol mixture which consists of 100 parts by weight of water, 0.7 to 3.5 parts by weight of dry agar and 10 to 40 parts by weight of starch, optionally further incorporating an effective amount of a thickener and, retaining the agar in a dissolved state and the starch in an ungelatinized state which possesses a viscosity in the range of from 100 to 6500 cp (as measured at 55° C.), and subsequently shaping the sol mixture into noodles by extrusion through an orifice. The noodles which are obtained by the step of extrusion may be boiled so as to be consumed immediately. Otherwise the noodles or the boiled noodles may be given a drying treatment so as to prepare dried noodles for preservation.

Now, the method of the present invention will be described specifically. 100 parts by weight of water to be used in this invention means, as will be touched upon afterward, the total amount of water required for dissolving agar, for suitably suspending starch and for other purposes involved in the preparation of the sol mixture to be extruded.

The agar to be used in this invention can be any of the various polysaccharides which are extracted from gelidium and other kinds of red algae. For example, refined agar which is used for the production of tokoroten (jelly made of agar alone) or Japanese-style confections or unrefined agar liquid (which must be tested for dry agar content to determine its proper amount for use in the sol mixture) may be used. It is, however, preferred to use refined agar which possesses high gel strength and does not retain the peculiar algal odor. Although the temperature at which agar undergoes gelation is variable with its kind in the range of from 30° to 45° C., it is generally in the neighborhood of 40° C. In the preparation of the sol mixture, the agar may be used in the form of an aqueous solution prepared in advance by mixing with water. In the sol mixture which further incorporates starch and other optional ingredients, the agar is used effectively in an amount of from 0.7 to 3.5 parts by weight (as dry matter) per 100 parts by weight of water. If the amount of agar used is less than 0.7 parts by weight, the noodles to be produced will possess weak viscoelasticity and adhesion and break easily into short pieces, making it difficult to produce noodles of desired length. If the amount of agar is greater than 3.5 parts by weight, the noodles produced will possess excessive gel strength and produce an undesirable mouthfeel resembling the shivering (jelly-like) sensation produced by itokonnyaku (glucomannan noodles). The aqueous solution of agar to be produced in advance can be obtained by placing dry agar in water, allowing, or not allowing, the agar to stand in the water for a suitable length of time enough for the purpose of impregnation of the agar with water, and heating the water and the agar under agitation until the temperature reaches the neighborhood of the boiling point to ensure thorough dissolution of agar.

The starch to be used in the present invention can be any of various starches such as, for example, those derived from potato, arrowroot, bracken, dogtooth violet, sweet potato, tapioca, rice, corn and wheat. To produce noodles which will not readily break into short pieces, it is desirable to select the starchs derived from the root stocks of potato, arrowroot, bracken, dogtooth violet, sweet potato and tapioca among the above starch sources. Use of potato starch proves to be most preferable. The inventors studied various materials to be mixed with agar and have, consequently, found that starches in general show the highest degrees of miscibility with agar and best suit the purpose of mixture with agar and that the starches derived from root stocks, among others, are ideal for the purpose.

In contrast, proteins such as soybean protein and glutens do not show quite favorable miscibility with agar. When a protein-containing material such as soybean flour or wheat flour is added to agar, the noodles produced must be subjected to a treatment whereby the protein contained therein is denatured by freezing to acquire suitable hydrophobicity. Otherwise, the noodles do not acquire the desired viscoelasticity but become as fragile as tokoroten (jelly made of agar alone). In the case of noodles which are produced by adding soybean protein (of a grade of 80% purity) as an extra ingredient to the sol mixture formed of agar and starch by the method of this invention, the cross section of a sample noodle, when smeared with a dye and observed through a microscope, shows clusters of protein particles scattered here and there in the gel of agar. These clusters go to weaken the physical strength of noodles.

A protein-containing material may be used in a small amount on condition that the addition thereof will produce substantially no adverse effect on the physical strength of the noodles obtained as the final product. In the same way, part of the various starches mentioned above may be substituted with a material such as grain flour which has starch as its principal constituent. It is essential that the amount of protein to be used in the sol mixture should be limited below 4 W/W% based on the starch being used.

The amount of starch to be used in the sol mixture is in the range of from 10 to 40 parts by weight per 100 parts by weight of water. If the amount of starch is less than 10 parts by weight, the noodles produced become fragile and watery and lack viscoelasticity. If the amount of starch is greater than 40 parts by weight, the noodles become pasty and produce inferior mouthfeel. The term "starch" as used herein means starch which is not gelatinized and possesses a starch-grain structure.

The sol mixture which is prepared by mixing water, agar and starch and optionally adding thereto a thickener of the type to be described in detail afterward is required to exhibit a viscosity in the range of from 100 to 6500 cp, preferably from 150 to 3000 cp (as measured at 55° C.). The viscosity as used in this invention is the value which is determined with a B-type viscosimeter (Vismetron, made by Seiki Kogyo Lab.) under the conditions of 55° C. of temperature, rotor No. 1 to 4, 60 rpm of speed and 30 seconds of test duration.

The statement that, in the present invention, the viscosity of the sol mixture at 55° C. is in the range of from 100 to 6500 cp does not necessarily mean that the sol mixture prepared for shaping by extrusion should be extruded at a temperature of 55° C. Actually, the statement means that, to produce noodles of good quality, the sol mixture should possess properties such that it exhibit viscosity of 100 to 6500 cp at 55° C. For the sol mixture, the essential requirement is that at the time it is extruded, it retains the agar in an ungelled state and the starch in an ungelatinized state respectively.

If the viscosity of the sol mixture is less than 100 cp, the produced noodles possess poor viscoelasticity and tend to break into small pieces or the sol mixture extruded expands and fails to form noodles. When the sol mixture is prepared by using the agar in a small amount and/or using the starch in a small amount, for example, the viscosity of the sol mixture may fail to reach 100 cp. In this case, noodles of required quality can be produced by adding to the sol mixture a suitable amount of a thickener enough to increase the viscosity to the range of from 100 to 6500 cp. Naturally, this addition of a thickener for the purpose indicated above is embraced by the present invention. What is essential for the purpose of this invention is the fact that the sol mixture prepared by mixing water, agar and starch and optionally adding thereto a thickener should exhibit the viscosity in the range of from 100 to 6500 cp. When the sol mixture formed of water, agar and starch only possesses the viscosity in the range of from 100 to 6500 cp, the addition of thickener is not necessary. Even if the sol mixture has a viscosity exceeding 100 cp, use of a suitable amount of the thickener may be found necessary when the noodles to be produced are desired to possess rather hard texture. The addition of the thickener for this purpose also is embraced by the present invention.

Since agar is an expensive commodity, it is economically desirable to use the thickener for the purpose of keeping down the amount of agar to be used. As described above, the upper limit of the viscosity of the sol mixture for this invention is fixed at 6500 cp. If the viscosity exceeds this upper limit, there ensues a disadvantage that the noodles produced assume a mouthfeel resembling the shivering (jelly-like) sensation produced by itokonnyaku (noodles of glucomannan) or the sticky sensation produced by paste.

The thickener to be used in the sol mixture of this invention can be any of the substances which possess an activity of enhancing the viscosity of the sol mixture. Examples of the substances usable as the thickener include gums such as guar gum, locust bean gum and xanthan gum, cellulose derivatives such as carboxy methylcellulose soda, starches such as gelatinized starch and starch phosphate, water-soluble proteins such as casein soda and non-denatured egg white, polysaccharides such as glucomannan, pectin and carrageenan and other hydrophilic substances capable of enhancing the viscosity. For the texture of noodles, use of gelatinized starch, carboxy methylcellulose soda or guar gum proves to be most desirable.

By mixing water, agar and starch and optionally adding thereto a thickener, there is produced a sol mixture. To obtain this sol mixture advantageously, the ambient temperature should be neither lower than the gellation temperature of the agar being used nor higher than the gelatinization temperature of the starch being used during and after mixing of the materials. Now, a typical example of the procedure followed in the preparation of the sol mixture will be described. It should be noted that the present invention is not limited to this example in any way.

As the first step, agar is placed in water and then dissolved by heating to produce an aqueous solution of agar. At this stage, a thickener may be dissolved in conjunction with the agar in the water as described further afterward. Then, the aqueous solution of agar is mixed with starch. If the starch is suspended in a small volume of water in advance, then the mixing of the aqueous solution with the starch proceeds smoothly and uniformly without entailing possible inclusion of air bubbles.

If the agar is gelled before it is mixed with the starch, the gelled agar prevents itself from being thoroughly mixed with other ingredients. If the agar is gelled after it is mixed with other ingredients and before the resultant sol mixture is extruded through the orifice, the noodles tend to break readily while the sol mixture is being extruded. If, on the other hand, the starch is gelatinized before it is mixed with other ingredients, it tends to prevent itself from being thoroughly mixed with the other ingredients. If the starch assumes a gelatinized state after it is mixed with other ingredients, the noodles to be obtained by extruding the sol mixture tend to assume an inferior texture which gives a viscous mouthfeel.

The sol mixture of good quality aimed at by this invention, therefore, can easily be obtained by giving due consideration to the gellation temperature of the agar being used and the gelatinization temperature of the starch being used. Generally, the gellation temperature of agar is about 40° C. and the gelatinization temperature of starch is about 60° C. These temperatures are variable to some extent, depending on the kinds of raw materials to be used, the methods of their production, etc. When a thickener is used in the sol mixture, the nature of the thickener must also be taken into due consideration.

After the sol mixture is prepared, until it is shaped by extrusion, it must be kept in such a manner that the agar component thereof will not be gelled as by decrease of temperature and the starch component thereof may not be gelatinized as by increase of temperature. At times, after the aqueous solution of agar is mixed with starch, the resultant mixture may be heated for a short time to a temperature exceeding the gelatinization temperature of starch so as to permit only a small portion of the starch component of the mixture to be gelatinized. This increase of temperature is permitted solely for the purpose of using the gelatinized starch as the thickener. This partial gelatinization of starch in the sol mixture is also embraced by the present invention. In this case, therefore, the substantial majority of the starch in the sol mixture is not heated above the gelatinization temperature.

The thickener can be suitably used, with due consideration paid to its own nature, so as to be mixed uniformly with the other ingredients of the sol mixture. The method and sequence of mixture of the thickener are not specifically limited.

For example, the thickener may be added at the time the agar is being heated in water for the preparation of an aqueous solution, so that there will be obtained a thickener-containing aqueous agar solution. Ungelatinized starch may be added at the time the agar is being thermally dissolved so that the starch will be gelatinized by the heat being used for the dissolution of agar. This treatment represents a case wherein the gelatinized starch is used as the thickener. To permit the thickener to be readily mixed uniformly with the other ingredients of the sol mixture, it may be dissolved all by itself before it is mixed with the other ingredients. The amount of the thickener to be used is not specifically limited. The primary function of the thickener is to allow the viscosity of the sol mixture to which the thickener is added to be increased to the range of from 100 to 6500 cp (as measured at 55° C.). The necessity for this addition of the thickener and the amount of the thickener to be used can easily be determined by trial manufacture of noodles. Solely from the standpoint of lowering the caloric value, the thickener to be used is desired to have no appreciably high caloric value and, when the thickener adopted happens to have any caloric value, it is desired to be used in as small a volume as permissible. In the case of gelatinized starch, the amount of the starch to be used is desired to be even less than 5 parts by weight per 100 parts by weight of water, so that the noodles finally produced will produce agreeable mouthfeel.

The sol mixture prepared as described above is now forced out through an orifice of a circular, rectangular or some other suitable shape to produce noodles of a corresponding cross section. Thus, the noodles can be produced in various shapes including strings, thin strips, etc. The machine to be used for the purpose of this extrusion can be any of known extruding machines such as a noodle-making machine. The only requirement to be satisfied is that the machine should possess a proper orifice which permits smooth passage of the sol mixture. The machine provided with a plurality of such orifices can effect the extrusion of the sol mixture with added efficiency.

The surrounding atmosphere into which the sol mixture is extruded through the orifice may be air, hot steam or water. When the sol mixture is extruded in water, the orifice may be positioned in water or above water, whichever is more convenient for the operation.

When the sol mixture is extruded through the orifice, the agar of the sol mixture must be gelled so as to impart to the noodles consequently obtained a definite shape. This requirement is easily fulfilled by exposing the extruded noodles to an ambient temperature below the gellation temperature of the agar.

When the sol mixture is extruded into an ambient temperature higher than the temperature at which the starch is gelatinized, the starch component of the noodles is gelatinized upon extrusion, giving to the noodles a texture which has good viscoelasticity and resists breakage. Also in this manner of extrusion molding, the extruded noodles of the sol mixture must be exposed to an atmosphere, which provides satisfactory gellation of the agar component of the mixture so as to impart to the produced noodles a definite shape.

To be specific, this exposure is accomplished by extruding the noodles in an atmosphere wherein the temperature is adjusted by a current of air kept below the gellation temperature of the agar or in water whose temperature is kept below the gellation temperature of the agar. Otherwise, for the gelatinization of the starch component of the sol mixture, the extruded noodle may be received in a current of hot steam or hot air kept above the gelatinization temperature of starch, or in water kept above the gelatinization temperature mentioned above. In the latter manner of extrusion molding, the noodles of the sol mixture which have been extruded to the elevated temperature are desired to be quickly cooled to a level enough to provide desired gellation of the agar. For uniformizing the thickness of finally produced noodles, it is preferable to extrude the noodles into water.

By extruding the sol mixture retained in the state of sol, long unbroken noodles can be continuously produced with ample rapidity. When the sol mixture is gelatinized before it is extruded, the gelled mixture becomes fragile to a point where it is no longer easy to produce long unbroken noodles with high efficiency.

For the purpose of quality improvement, this invention permits additional use of alum, sugar alcohol, oil and fat, surfactant, and polyphosphate in the form of a composition besides the essential ingredients.

Alum serves to tighten the texture of noodles and improve the mouthfeel. The alum to be used in this invention may be any of various alums such as, for example, potassium alum, aluminum alum, ammonium alum, burnt alum and iron alum. In the present invention, if the alum to be used happens to have a high iron ion content, it has a fair possibility of impairing the taste and color of the produced noodles. It is, therefore, desirable to use an alum of the type which contains aluminum ion. The desired effect of the alum can be attained by mixing this alum with the agar and starch during the preparation of the sol mixture or having the alum dissolved in advance in the water in which the sol mixture is extruded. Particularly in the latter case, since the alum acts preponderantly on the surface portion of noodles and, consequently, prevents possible adhesion of adjacent noodles, it becomes possible to produce noodles which do not conglomerate into one mass but retain their shape intact while they are being cooked. When the alum is added to the sol mixture, it is proper to limit the amount of alum in the range of from about 0.1 to about 1.0 mM as a trivalent metal ion per kg of the sol mixture. When the alum is dissolved in water for receiving the extruded noodles, it is sufficient to limit the amount of alum in the range of from about 1.0 to about 80 mM as a trivalent metal ion per kg of water.

Sugar alcohol serves to improve the continuity of noodles and impart elasticity to the noodles. The sugar alcohol to be used for this invention may be any of various kinds of sugar alcohols such as, for example, sorbitol, xylitol, and mannitol. The sugar alcohol can be effectively mixed with the aqueous agar solution, starch, etc. at the time of the preparation of the sol mixture. It is proper to limit the amount of sugar alcohol for addition to the sol mixture in the range of from about 0.1 part by weight to about 5.0 parts by weight per 100 parts by weight of the sol mixture.

Noodles of modified quality and noodles with special flavor can be produced by suitably adding proteins, amino acids, grain flour, oil and fat, table salt and other seasonings, food colors, etc. in amounts not so large as to impair the objects of this invention, during the production of noodles. The addition of oil and fat and surfactant has an effect of facilitating the operation of extrusion at the time the sol mixture is extruded. At the time the noodles are served as meals, they must be in such a state that the starch component thereof is in a gelatinized state. When the sol mixture is extruded into a low-temperature atmosphere, therefore, the produced noodles must be boiled. In the case of the noodles which have been extruded into an ambient temperature higher than the gelatinizing temperature of starch, they can be served without being additionally boiled.

Similarly to ordinary noodles such as udon (wheat vermicelli) and soba (buckwheat vermicelli), the noodles which are obtained by the method of this invention can be preserved in a refrigerated storage or in a storage kept under properly controlled water activity. They may otherwise be preserved after a proper drying treatment.

The noodles according to this invention can be cooked and consumed similarly to the ordinary noodles such as udon (wheat vermicelli) and soba (buckwheat vermicelli). They may otherwise be mixed with other foodstuffs, dressed with salads or treated in various similar manners to produce delicious dishes of Japanese, Chinese and European styles.

By full utilization of the high capacity which agar with no calories exhibits for gelation, the caloric value of the noodles obtained by the present invention can be lowered to the order of about one half to one eighth of the caloric value possessed by ordinary noodles such as udon (wheat vermicelli) and soba (buckwheat vermicelli). Moreover, the noodles of the present invention excel in terms of taste. Thus, consumers can eat large volumes of these noodles to satisfy their appetite without worrying about supernutrition. Thus, they make an ideal low-caloric food.

EXAMPLE 1

An aqueous agar solution was prepared by heating a mixture consisting of 13.5 g of powdered agar (T-1, made by Ina Food Industry Co., Ltd.) and 810 g of water. The aqueous agar solution was then cooled to about 60° C., and the cooled solution was mixed with a suspension (about 20° C.) prepared in advance by suspending 270 g of potato starch in 190 g of water to produce a sol mixture. The viscosity of this sol mixture, when measured with a B-type viscosimeter ("Vismetron" made by Seiki Kogyo Lab.) under the conditions of 55° C. of temperature, 60 rpm of speed and 30 seconds of test duration, was found to be 588 cp. When the sol mixture retained in the state of sol was extruded into water kept at about 18° C. with a noodle-making machine equipped with 2 mm diameter orifice dipped into a water bath, it was converted into noodles.

EXAMPLE 2

An aqueous agar solution containing gelatinized potato starch was prepared by heating a mixture consisting of 10 g of agar (same as that used in Example 1), 10 g of potato starch and 435 g of water. Then, the aqueous agar solution was cooled to about 60° C., and the cooled solution was mixed with a suspension (about 20° C.) prepared in advance by suspending 90 g of potato starch in 65 g of water to produce a sol mixture. The viscosity of this sol mixture was found to be 2800 cp. When this sol mixture retained in the state of sol was extruded with the same machine as used in Example 1 into a water bath kept at about 15° C., it was converted into noodles.

EXAMPLE 3

An aqueous agar solution was prepared by heating a mixture consisting of 7 g of agar (same as that used in Example 1), 6 g of carboxy methylcellulose soda and 900 g of water. Then the aqueous agar solution was cooled to about 55° C., and the cooled solution was mixed with a suspension (about 30° C.) prepared in advance by suspending 150 g of potato starch in 100 g of warm water to produce a sol mixture. The viscosity of this sol mixture was found to be 165 cp. When this sol mixture retained in the state of sol was extruded with the same machine as used in Example 1 into a water bath kept at about 5° C., it was converted into noodles.

EXAMPLE 4

An aqueous agar solution was prepared by heating a mixture consisting of 77 g of agar (same as that used in Example 1), 32 g of glucomannan, 32 g of high methyl ester pectin and 9 kg of water. Then, the aqueous agar solution was cooled to about 50° C., and the cooled solution was mixed with a suspension (about 40° C.) prepared in advance by suspending 1030 g of rice starch in 1 kg of water to produce a sol mixture. The viscosity of this sol mixture was found to be 617 cp. When this sol mixture retained in the state of sol was extruded with a machine possessed of an orifice 2 mm in length and 100 mm in width onto a stainless steel plate disposed inside an atmosphere wherein the temperature was kept constant with a current of cool air at about 5° C., it was converted into noodles of the shape of sheet (thin strips).

EXAMPLE 5

An aqueous agar solution containing gelatinized starch was prepared by heating a mixture consisting of 11.8 g of agar (same as that used in Example 1), 18.2 g of potato starch and 818 g of water. Then the aqueous agar solution was cooled to about 60° C., and the cooled solution was mixed with a suspension (about 20° C.) prepared in advance by suspending 255 g of potato starch in 182 g of water to produce a sol mixture. The viscosity of this sol mixture was found to be 1058 cp. When this sol mixture retained in the state of sol was extruded into a water bath kept at 90° C. with a machine possessed of an orifice 4 mm in diameter positioned 5 cm above the water surface, it was converted into noodles. The boiled noodles thus obtained were cooled to 5° C.

EXAMPLE 6

An aqueous agar solution containing gelatinized potato starch was prepared by heating a mixture consisting of 30 g of agar (same as that used in Example 1), 10 g of potato starch and 870 g of water. Then, the aqueous agar solution was cooled to about 60° C., and the cooled solution was mixed with a suspension (about 40° C.) prepared in advance by suspending 190 g of potato starch and 30 g of margarin in 130 g of warm water to produce a sol mixture. The viscosity of this sol mixture was found to be 6250 cp. When this sol mixture retained in the state of sol was extruded with the same machine as used in Example 5 into a water bath kept at about 18° C., it was converted into noodles.

EXAMPLE 7

An aqueous agar solution containing gelatinized starch was prepared by heating a mixture consisting of 10.3 g of powdered agar (My-Agar, made by Sato Agar-agar Trading Co., Ltd.), 5.1 g of sorbitol, 8.2 g of potato starch and 928 g of water. Then, the aqueous agar solution was cooled to about 55° C., and the cooled solution was mixed with a suspension (about 35° C.) prepared in advance by suspending 103 g of tapioca starch in 72 g of warm water to produce a sol mixture. The viscosity of this sol mixture was found to be 165 cp. When this sol mixture retained in the state of sol was extruded with the same machine as used in Example 1 into a water bath kept at about 5° C., it was converted into noodles.

EXAMPLE 8

An aqueous agar solution containing gelatinized starch was prepared by heating a mixture consisting of 10.3 g of agar (same as that used in Example 1), 5.2 g of potato starch and 928 g of water. Then the aqueous agar solution was cooled to about 60° C., and the cooled solution was mixed with a suspension (about 25° C.) prepared in advance by suspending 103 g of potato starch in 72 g of water to produce a sol mixture. The viscosity of this sol mixture was found to be 113 cp. When the sol mixture retained in the state of sol was extruded with the same machine as used in Example 1 into a water bath kept at about 5° C., it was converted into noodles.

The noodles thus produced were boiled in hot water at about 95° C., then cooled in tap water and cut to a length of about 4 cm. When the cut noodles were dressed with tomato catchup, there was obtained a cool dish of cooked noodles.

EXAMPLE 9

An aqueous agar solution containing gelatinized starch was prepared by heating a mixture consisting of 27.8 g of agar (same as that used in Example 7), 11 g of wheat starch and 1 kg of water. Then, the aqueous agar solution was cooled to about 55° C., and the cooled solution was thoroughly mixed with 333 g of wheat starch to produce a sol mixture. The viscosity of this sol mixture was found to be 800 cp. When this sol mixture retained in the state of sol was extruded into an aqueous 0.2 W/V% potassium alum solution kept at about 10° C. with a noodle-making machine provided with an orifice 3 mm in diameter positioned so that the orifice was dipped in the alum solution, it was converted into noodles.

The noodles were boiled in hot water at about 95° C., cooled in tap water and cut to a length of about 2 to 5 cm. When the cut noodles were neatly placed in conjunction with lettuce, wakame seaweed and shrimps on a plate, cooled and sprinkled with salad dressing, there was obtained a fanciful dish of cool noodles.

EXAMPLE 10

An aqueous agar solution was prepared by heating a mixture consisting of 8.3 g of agar (same as that used in Example 1), 4.2 g of guar gum, 8.3 g of sorbitol and 750 g of water. Then this aqueous agar solution was cooled to about 60° C., and the cooled solution was mixed with a suspension (about 20° C.) prepared in advance by suspending 333 g of potato starch and 5 g of table salt in 250 g of water to produce a sol mixture. The viscosity of this sol mixture was found to be 1360 cp. When this sol mixture retained in the state of sol was extruded with the same machine as used in Example 1 into hot water kept at about 90° C., there was obtained transparent boiled noodles. Then, the boiled noodles were dried in a current of air to produce dry noodles having a water content about 20 W/W%.

When a consomme-type soup containing finely chopped onion and similarly chopped tomato was prepared, the dry noodles cut to a length of about 3 cm were added to the soup at the final step of preparation and the soup containing the cut noodles was heated to boil the noodles. At this point, the soup was sprinkled with finely cut parsley. Consequently, there was obtained a fanciful dish of cooked noodles. The boiled noodles were found to have a caloric value of 25 kcal per 100 g.

EXAMPLE 11

An aqueous agar solution was prepared by heating a mixture consisting of 10.0 g of agar (same as that used in Example 1) and 425 g of water. Then, the aqueous agar solution was cooled to about 60° C., and the cooled agar solution was mixed with a mixture (about 20° C.) consisting of 40 g of potato starch, 35 g of soft flour and 75 g of water to produce a sol mixture. The viscosity of this sol mixture was found to be 1730 cp. When the sol mixture retained in the state of sol was extruded with the same machine as used in Example 1 into a water bath at about 5° C., it was converted into noodles.

The noodles were boiled in hot water at about 95° C. and then soaked with a Chinese-style noodle soup boiled in advance. Consequently, there was obtained a good dish of Chinese noodles.

What is claimed is:

1. A method for the production of a low-caloric noodle comprising the steps of preparing a sol mixture having a composition of 100 parts by weight of water, 0.7 to 3.5 parts by weight of agar and 10 to 40 parts by weight of starch, containing the agar in a dissolved state and the starch in an ungelatinized state and exhibiting a viscosity of 100 to 6500 cp at 55° C. and subsequently shaping the sol mixture by extrusion through an orifice.

2. The method according to claim 1, wherein the starch is a starch derived from a rootstock.

3. The method according to claim 1, which further comprises using a thickener as an additional ingredient of the sol mixture.

4. The method according to claim 3, wherein the thickener is at least one member selected from the group consisting of gelatinized starch, carboxy methylcellulose soda and guar gum.

5. The method according to claim 1, wherein the sol mixture to be used exhibits a viscosity in the range of from 150 to 3000 cp at 55° C.

6. The method according to claim 3, wherein the sol mixture to be used exhibits a viscosity in the range of from 150 to 3000 cp at 55° C.

7. The method according to claim 1, which further comprises using alum as an additional ingredient of the sol mixture.

8. The method according to claim 1, wherein the sol mixture is extruded into an aqueous solution of alum.

9. The method according to claim 3, wherein the starch is a starch derived from a rootstock, the thickener is at least one member selected from the group consisting of gelatinized starch, carboxy methylcellulose soda and guar gum, and the sol mixture exhibiting the viscosity in the range of from 150 to 3000 cp at 55° C. is extruded into an aqueous solution of alum.

10. The product produced according to the method of claim 1.

11. The product produced according to the method of claim 2.

12. The product produced according to the method of claim 3.

13. The product produced according to the method of claim 4.

14. The product produced according to the method of claim 5.

15. The product produced according to the method of claim 6.

16. The product produced according to the method of claim 7.

17. The product produced according to the method of claim 8.

18. The product produced according to the method of claim 9.

* * * * *